US007983293B2

(12) United States Patent
Kusunoki et al.

(10) Patent No.: US 7,983,293 B2
(45) Date of Patent: Jul. 19, 2011

(54) EXTERNAL SIGNAL SUPPLY UNIT, VEHICLE STATE ACQUISITION SYSTEM AND EXTERNAL SIGNAL SUPPLY METHOD

(75) Inventors: Hideki Kusunoki, Nishikamo-gun (JP); Takashi Kida, Toyohashi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1594 days.

(21) Appl. No.: 10/893,499

(22) Filed: Jul. 19, 2004

(65) Prior Publication Data
US 2005/0024193 A1 Feb. 3, 2005

(30) Foreign Application Priority Data
Jul. 30, 2003 (JP) .................................. 2003-203607

(51) Int. Cl.
*H04L 12/413* (2006.01)
*H04B 3/20* (2006.01)
*H04B 7/00* (2006.01)

(52) U.S. Cl. ......................... 370/445; 370/286; 370/310

(58) Field of Classification Search ........................ None
See application file for complete search history.

(56) References Cited

U.S. PATENT DOCUMENTS

| 5,880,363 | A | 3/1999 | Meyer et al. | |
|---|---|---|---|---|
| 6,218,936 | B1 | 4/2001 | Imao | |
| 6,317,882 | B1 | 11/2001 | Robbins | |
| 2001/0018346 | A1* | 8/2001 | Okajima et al. | 455/437 |
| 2002/0070876 | A1 | 6/2002 | Hirohama et al. | |
| 2002/0184389 | A1* | 12/2002 | Sherman | 709/245 |
| 2003/0014164 | A1* | 1/2003 | Shin | 701/2 |
| 2004/0037224 | A1* | 2/2004 | Choi et al. | 370/235 |
| 2004/0061604 | A1* | 4/2004 | Giles | 340/539.1 |
| 2004/0150516 | A1* | 8/2004 | Faetanini | 340/444 |
| 2009/0028174 | A1* | 1/2009 | Schrader et al. | 370/442 |

FOREIGN PATENT DOCUMENTS

| DE | 198 39 478 A1 | 3/2000 |
|---|---|---|
| EP | 0 671 289 A1 | 9/1995 |
| EP | 1 026 015 A2 | 8/2000 |

(Continued)

OTHER PUBLICATIONS

U.S. Appl. No. 10/903,385, dated Aug. 2, 2004, Ide.

(Continued)

*Primary Examiner* — Kwang B Yao
*Assistant Examiner* — Jutai Kao
(74) *Attorney, Agent, or Firm* — Oliff & Berridge, PLC

(57) ABSTRACT

If a trigger unit in a set range is received after a transmission, an annunciation portion is advised of a likelihood of radio interference. In this case, no trigger signal is supplied. If identifier information that has been received corresponds to the identifier information stored in a memory after the transmission of a trigger signal, a count value remains untouched (YES in S55). It is apparent that identifier information was transmitted before from one of wheel-side units that has supplied a trigger signal, and that the trigger signal has not been received by a desired one of the wheel-side units. An operator can supply a trigger signal again through a change in relative position or the like.

22 Claims, 8 Drawing Sheets

FOREIGN PATENT DOCUMENTS

| | | |
|---|---|---|
| JP | A-60-083427 | 5/1985 |
| JP | A 9-279917 | 10/1997 |
| JP | B-2875019 | 1/1999 |
| JP | A 2000-233615 | 8/2000 |
| JP | A-2001-108551 | 4/2001 |
| JP | A 2003-72330 | 3/2003 |
| JP | A-2003-267007 | 9/2003 |
| WO | WO 03/093074 A1 | 11/2003 |

OTHER PUBLICATIONS

Feb. 12, 2008 Office Action issued in Japanese Patent Application No. 2003-204557 (with translation).
Nov. 16, 2010 Office Action issued in Japanese Patent Application No. 2007-201120 (with translation).
Feb. 20, 2008 Office Action issued in U.S. Appl. No. 10/903,385.
Sep. 17, 2008 Office Action issued in U.S. Appl. No. 10/903,385.

* cited by examiner

EXTERNAL SIGNAL SUPPLY UNIT, VEHICLE STATE ACQUISITION SYSTEM AND EXTERNAL SIGNAL SUPPLY METHOD

INCORPORATION BY REFERENCE

The disclosure of Japanese Patent Application No. 2003-203607 filed on Jul. 30, 2003, including the specification, drawings and abstract is incorporated herein by reference in its entirety.

BACKGROUND OF THE INVENTION

1. Field of the Invention

The invention relates to external signal supply unit and method that supply an external signal to an on-vehicle unit. The invention also relates to a vehicle state acquisition system.

2. Description of the Related Art

Japanese Patent Application Laid-Open No. JP-A-2000-233615 discloses a vehicle state acquisition system having a wheel-side unit and a vehicle-body-side unit that acquires a state of a wheel on the basis of information supplied from the wheel-side unit. In the case where identifier information on the wheel-side unit is registered in the vehicle-body-side unit in this vehicle state acquisition system, some pieces of identifier information that have been received within a set period since the setting of a registration mode are registered in descending order of reception frequency. The number of the pieces of information is equal to the number of wheels. The identifier information transmitted from the wheel-side unit installed in the vehicle is received more frequently than the identifier information transmitted from a wheel-side unit in another vehicle. Therefore, this vehicle state acquisition system makes it possible to avoid erroneous registration of the identifier information transmitted from a wheel-side unit in another vehicle.

If identifier information is registered or inspected in a generally employed vehicle state acquisition system, an external signal supply unit supplies a wheel-side unit with a transmission command signal commanding transmission of identifier information as an external signal. In accordance therewith, the wheel-side unit transmits identifier information. This identifier information is registered in a vehicle-body-side unit or utilized for inspection.

In this case, if a transmission command signal is supplied from an external signal supply unit to wheel-side units, for example, in each of adjacent vehicles, identifier information is transmitted from each of the wheel-side units. As a result of radio interference, a vehicle-body-side unit may not receive the identifier information normally. In this case, the identifier information may not be registered or normally utilized for inspection in the vehicle-body-side unit. Also, radio collision may occur among a plurality of external signals. The vehicle-body-side unit cannot receive an external signal in a good condition, and no identifier information is transmitted therefrom. In this case as well, no identifier information is registered or the implementation of an inspection is impossible in the vehicle-body-side unit. Further, the wheel-side unit to which an external signal ought to have been supplied from the external signal supply unit may not actually receive the external signal. No identifier information is transmitted from the wheel-side unit, and the identifier information on the wheel-side unit is not registered or the implementation of an inspection is impossible in the vehicle-body-side unit. The operator cannot find out, for example, that the identifier information on the wheel-side unit has not been registered. For example, if a piece of identifier information that ought to be registered has not been registered, a correction such as addition of another piece of identifier information or the like is required. The operator makes this correction.

SUMMARY OF THE INVENTION

It is an object of the invention to improve an external signal supply unit. For example, the invention aims at obtaining an external signal supply unit that can solve at least one of the aforementioned problems in the case where the external signal supply unit is used during an operation relating to the registration of identifier information in the aforementioned vehicle state acquisition system, and obtaining a vehicle state acquisition system provided with an external signal supply unit capable of solving at least one of the aforementioned problems. This object is achieved by constructing an external signal supply unit and a vehicle state acquisition system according to the following aspects. As is the case with the claims, the aspects are classified into clauses. Each of the clauses is accompanied by a number and, if necessary, cites a number of another one of the clauses. This is exclusively intended to facilitate the understanding of the art described in the present specification. The technical features described in the present specification and any combinations thereof should not be construed to be limited to any of the following clauses. If there are a plurality of statements in a single clause, it is not indispensable that all these statements be adopted together. Instead, it is also appropriate that one or some of them be selected and adopted.

(1) An external signal supply unit that supplies an external signal to an on-vehicle unit mounted in a vehicle through radio communication, characterized by comprising an operation control portion that controls an operation state thereof in accordance with at least one on-vehicle unit in a set range that is determined in advance. In the external signal supply unit according to the present clause, the operational control thereof is controlled in accordance with the state of the at least one of the on-vehicle units in the set range. Therefore, for example, it is possible to supply an external signal to the on-vehicle unit more reliably, to guarantee the on-vehicle unit to operate in accordance with an external signal more reliably, and to guarantee another on-vehicle unit to operate in accordance with the operation of the on-vehicle unit more reliably. The set range, in which a signal from the external signal supply unit can be received, is determined, for example, by a transmission state, a reception state and the like of a signal from the external signal supply unit. The on-vehicle unit is mounted in the vehicle. At least one of a unit that performs an operation in accordance with an external signal that has been supplied, a unit that operates in accordance with the operation (e.g., a unit that operates in an n-dimensional manner, for example, a two-dimensional or three-dimensional manner), and the like is regarded as the on-vehicle unit. The on-vehicle unit in the set range does not necessarily mean an on-vehicle unit mounted in the vehicle. That is, while an on-vehicle unit mounted in another vehicle may be in the set range, an on-vehicle unit mounted in the vehicle may not be in the set range. It is optional that the external signal include contents. At least one of sequential states and the like that are inevitably created by supplying an external signal, for example, a reception state of an external signal in the on-vehicle unit, an operation state (also including an n-dimensional operation state such as a two-dimensional or three-dimensional operation state or the like) of the on-vehicle unit as a response to the reception of an external signal, and the like corresponds to the state of the on-vehicle unit. A reception state of an external signal in the on-vehicle unit can be expressed by indicating whether or not an external signal has been supplied thereto from another external signal supply unit or whether or not an external signal has ever been received thereby (whether or not an external signal has already been received). The operation state of the external signal supply unit refers to the operation state of at least one of components included in the external signal supply unit. For example, in the case where the external signal supply unit includes an external signal transmission portion, an annunciation portion, an on-vehicle unit state determination portion and the like, the operation state of the external signal supply unit refers to an operation state of the external signal transmission portion, an annunciation state of the annunciation portion, a state of implementation of a determination by the on-vehicle unit state determination portion, or the like. The transmission of an external signal can be permitted, prohibited, etc. by controlling the external signal transmission portion. Desired contents can be annunciated by controlling the annunciation portion. The annunciation portion may be designed to provide either the operator or another control unit (which does or does not correspond to the on-vehicle unit) with information. The determination can be carried out or suspended by controlling the on-vehicle unit state determination portion. If the external signal supply unit is a movable unit including a drive portion, it is appropriate that the drive portion be controlled. For example, if the external signal supply unit is designed to supply external signals to on-vehicle units respectively and sequentially while moving, it can be moved or stopped by controlling the drive portion. For example, in the case where a wheel-side unit as an on-vehicle unit transmits identifier information in accordance with an external signal, where a vehicle-body-side unit as another on-vehicle unit receives the identifier information, where the received identifier information is registered or utilized for an inspection, where there are a plurality of external signal supply units in a set range, where an external signal has been supplied from each of the external signal supply units, and where identifier information has been transmitted from a plurality of on-vehicle units, the vehicle-body-side unit may not be able to receive the identifier information normally as a result of radio interference. In this case, the external signal supply unit can be prevented from transmitting an external signal. The operation of "preventing the external signal supply unit from transmitting an external signal means (a) an operation of preventing automatic transmission of an external signal, (b) an operation of disabling an operation member from being turned on if an external signal is to be transmitted by turning the operation member on, (c) an operation of preventing the operation member from being turned on by annunciating a great likelihood of radio interference, and the like. In any case, while radio interference is avoided, the vehicle-body-side unit can reliably receive identifier information.

(2) The external signal supply unit according to clause (1), wherein the operation control portion includes a transmission suppression portion that suppresses transmission of an external signal transmitted from an external signal supply unit other than the external signal supply unit if there is at least one on-vehicle unit receiving the external signal in the set range. As described above, a state where there is at least one on-vehicle unit that receives an external signal transmitted from another external signal supply unit in addition to the on-vehicle unit (e.g., the wheel-side unit) corresponding to the external signal supply unit is also regarded as a state where an operation (registration of identifier information or an inspection with the aid of identifier information) of another on-vehicle unit (e.g., a vehicle-body-side unit) corresponding to an operation (e.g., transmission of identifier information) corresponding to an external signal from the on-vehicle unit is highly unlikely to be performed normally. In this case, the suppression of transmission is desirable. The suppression of transmission means the prohibition of transmission, the retardation of transmission, and the like. It is also possible to wait for the completion of transmission of an external signal from another external signal supply unit and to allow an external signal to be transmitted from the external signal supply unit. It is also appropriate that the transmission of an external signal from an additional external signal supply unit be suppressed through a communication between the external signal supply unit and the additional external signal supply unit.

(3) The external signal supply unit according to clause (1), wherein the operation control portion includes a transmission state control portion that suppresses the transmission of an external signal in the case where at least one on-vehicle unit in the set range has received an external signal transmitted from an additional external signal supply unit other than the external signal supply unit and where the external signal supply unit is selected through a bidirectional communication between both the external signal supply units. Through a communication between the external signal supply unit and the additional external signal supply unit, that one of the external signal supply units from which the transmission of an external signal is suppressed is determined. The transmission of an external signal is suppressed in the determined one of the external signal supply units.

(4) The external signal supply unit according to any one of clauses (1) to (3), wherein the external signal supply unit includes an external signal transmission portion that transmits the external signal and wherein the operation control portion includes a transmission suppression portion that suppresses the operation of the external signal transmission portion if at least one on-vehicle unit in the set range is receiving an external signal supplied from an additional external signal supply unit other than the external signal supply unit.

(5) The external signal supply unit according to any one of clauses (1) to (4), wherein the external signal supply unit includes an annunciation portion that annunciates a state of at least one on-vehicle unit in the set range, and wherein the operation control portion includes an annunciation control portion that controls the annunciation portion to annunciate a statement that at least one on-vehicle unit in the set range is receiving an external signal supplied from an additional external signal supply unit other than the external signal supply unit if the statement turns out to be true. If at least one on-vehicle unit in the set range is receiving an external signal supplied from the additional external signal supply unit, the annunciation portion annunciates this fact.

(6) The external signal supply unit according to any one of clauses (1) to (5), wherein the operation control portion includes an annunciation control portion that ensures annunciation of a statement that the on-vehicle unit to which the external signal has been supplied received the external signal previously if the statement turns out to be true. In the external signal supply unit according to the present clause, it is possible to find out that the on-vehicle unit to which an external signal has been supplied received the external signal previously and that an operation corresponding thereto has been terminated. This applies, for example, to a case where the on-vehicle unit (a desired one of the on-vehicle units) to which an external signal ought to have been supplied is different from the on-vehicle unit that has actually received the external signal and where the on-vehicle unit that has received an external signal received the external signal in the past. If this is annunciated, an operation of supplying an external signal may be performed correspondingly. For example, a change or the like in relative positional relationship between a desired one of the on-vehicle units and the external signal supply unit is made, so that an external signal can be supplied again to the desired one of the on-vehicle units. The change in relative positional relationship means an increase or decrease in distance, a change of opposed faces, or the like.

(7) The external signal supply unit according to any one of clauses (1) to (6), wherein the operation control portion includes an annunciation control portion that ensures annunciation of a statement that an on-vehicle unit to which the external signal is to be supplied received the external signal previously if the statement turns out to be true. In the external signal supply unit according to the present clause, before an external signal is actually supplied to the on-vehicle unit, it is possible to find out that the on-vehicle unit received the external signal previously. Therefore, there is no need to supply the external signal again, and wasteful supply of an external signal from the external signal supply unit can be prevented. For example, this is applicable to a case where the on-vehicle unit periodically transmits a later-described piece of identifier information.

(8) The external signal supply unit according to any one of clauses (1) to (7), including a transmission command signal transmission portion that transmits a transmission command signal commanding transmission of identifier information indicating an on-vehicle unit as the external signal, an identifier information reception portion that receives identifier information that has been transmitted from the on-vehicle unit in accordance with the transmission command signal, an identifier information storage portion that stores identifier information that has been received by the identifier information reception portion, an annunciation portion that annunciates the number of on-vehicle units that have transmitted the identifier information, and an annunciation control portion that increases the number of the on-vehicle units to be annunciated by the annunciation portion by 1 if the identifier information received by the identifier information reception portion does not correspond to the identifier information stored in the identifier information storage portion and that does not increase the number of the on-vehicle units if the identifier information received by the identifier information reception portion corresponds thereto. The external signal supply unit according to the present clause transmits a transmission command signal as an external signal. The on-vehicle unit that has received the transmission command signal transmits identifier information, and the external signal supply unit receives and stores the identifier information transmitted from the on-vehicle unit. In the external signal supply unit, if the received identifier information corresponds to the stored identifier information, the on-vehicle unit is regarded as having already finished the transmission of identifier information. If the received identifier information does not correspond to the stored identifier information, the on-vehicle unit is not regarded as having finished the transmission of identifier information. The annunciation portion annunciates the number of the on-vehicle units that have transmitted identifier information by transmitting a transmission command signal. That is, if the annunciated number of the on-vehicle units has increased in the case of the transmission of a transmission command signal, it is apparent that identifier information has been successfully transmitted from a desired one of the on-vehicle units (i.e., that a transmission command signal has been received by that one of the on-vehicle units which has not finished the transmission of identifier information). If the annunciated number of the on-vehicle units has not increased, it is apparent that the transmission of identifier information from a desired one of the on-vehicle units has failed (i.e., that a transmission command signal has been transmitted to that one of the on-vehicle units which has already finished the transmission of identifier information and which is different from a desired one of the on-vehicle units). For example, if the annunciated "number of the on-vehicle units that have transmitted identifier information" has not increased, a transmission command signal can be transmitted again. Further, if the annunciated "number of the on-vehicle units that have transmitted identifier information" has increased, a transmission command signal can be transmitted again to a subsequent one of the on-vehicle units. In addition, if "the number of the on-vehicle units that have transmitted identifier information" has reached a desired number (i.e., the number of on-vehicle units which are mounted in the vehicle and to which identifier information is to be transmitted), it is apparent that sequential operations of transmitting identifier information (i.e., operations of supplying external signals) have been terminated as to the vehicle. The sequential operations of supplying external signals may be performed either by the operator or automatically. The annunciation portion may be designed, for example, to include a display for indicating the number of on-vehicle units, to include an audio annunciation portion that audibly annunciates the number of on-vehicle units, or to have a plurality of lamps whose blinking states are changed to annunciate the number of on-vehicle units.

(9) The external signal supply unit according to any one of clauses (1) to (8), including a transmission command signal transmission portion that transmits a transmission command signal commanding the transmission of identifier information indicating an on-vehicle unit as the external signal, an identifier information reception portion that receives identifier information that has been transmitted from the on-vehicle unit in accordance with the transmission command signal, an identifier information storage portion that stores identifier information that has been received by the identifier information reception portion, an annunciation portion that annunciates a reception state of an external signal in the on-vehicle unit, and an annunciation control portion that regards the on-vehicle unit as having received an external signal if the identifier information received by the identifier information reception portion does not correspond to the identifier information stored in the identifier information storage portion, that does not regard the on-vehicle unit as having received the external signal if the identifier information received by the identifier information reception portion corresponds thereto, and that thereby controls the annunciation portion. The external signal supply unit according to the present clause may be designed, for example, to indicate "OK" if a transmitted external signal has been received by a desired one of the on-vehicle units and to indicate "NG" if a transmitted external signal has not been received by a desired one of the on-vehicle units. If an external signal has been received by an on-vehicle unit in which identifier information has already been stored, the on-vehicle unit is different from the desired one of the on-vehicle units.

(10) The external signal supply unit according to any one of clauses (1) to (9), including a transmission command signal transmission portion that transmits a transmission command signal commanding the transmission of identifier information indicating an on-vehicle unit as the external signal, an identifier information reception portion that receives identifier information that has been transmitted from the on-vehicle unit in accordance with the transmission command signal, an identifier information storage portion that stores identifier information that has been received by the identifier information reception portion, and a reception state determination portion that regards the on-vehicle unit as having received an external signal if the identifier information received by the identifier information reception portion does not correspond to the identifier information stored in the identifier information storage portion and that does not regard the on-vehicle unit as having received the external signal if the identifier information received by the identifier information reception portion corresponds thereto. It is not indispensable to provide an annunciation portion that annunciates a result of a determination made as to a reception state.

(11) The external signal supply unit according to any one of clauses (1) to (10), including a transmission command signal transmission portion that transmits a transmission command signal commanding the transmission of identifier information indicating an on-vehicle unit as the external signal, an identifier information reception portion that receives identifier information that has been transmitted from the on-vehicle unit in accordance with the transmission command signal, an identifier information storage portion that stores identifier information that has been received by the identifier information reception portion, and a transmission control portion that ensures transmission of the transmission command signal to a subsequent one of the on-vehicle units if the identifier information received by the identifier information reception portion does not correspond to the identifier information stored in the identifier information storage portion and that ensures retransmission of a transmission command signal to the same on-vehicle unit if the identifier information received by the identifier information reception portion corresponds thereto. In the external signal supply unit according to the present clause, a subsequent operation is performed if the transmission of identifier information to the on-vehicle unit has succeeded, and a transmission command signal is transmitted again to the same on-vehicle unit if the transmission of identifier information to the on-vehicle unit has failed. If the transmission of identifier information to all the predetermined ones of the on-vehicle units has been terminated, a series of operations are terminated, and an operation for termination is performed. In transmitting a transmission command signal again, it is desirable but not indispensable to change a relative positional relationship between the on-vehicle unit and the external signal supply unit.

(12) The external signal supply unit according to any one of clauses (1) to (11), wherein the external signal supply unit includes a signal reception portion that receives a response signal that has been transmitted from the on-vehicle unit in accordance with the external signal, and wherein the operation control portion includes a determination control portion that determines whether or not that one of the on-vehicle units which has supplied the external signal received the external signal previously if the signal reception portion has received a response signal. The on-vehicle unit transmits a response signal in accordance with an external signal, and the external signal supply unit receives the transmitted response signal. If the external signal supply unit has received a response signal, it is determined on the basis of the received response signal whether or not the on-vehicle unit received an external signal previously. If no response signal has been received, no determination is made. The response signal makes it possible to distinguish one of the on-vehicle units from another. For example, the response signal may be identifier information.

(13) The external signal supply unit according to clause (11), wherein the external signal supply unit includes a signal reception portion that receives a response signal that has been transmitted from the on-vehicle unit in accordance with the external signal, and wherein the operation control portion includes a retransmission control portion that ensures re-supply of an external signal if it is determined on the basis of a response signal received by the signal reception portion that that one of the on-vehicle units which has supplied the external signal received the external signal previously. If that one of the on-vehicle units which has supplied an external signal received the external signal previously, the external signal could not be supplied to a desired one of the on-vehicle units. Hence, the external signal is supplied again. In this case, it is desirable that the external signal be transmitted after a change in the relative positional relationship between the external signal supply unit and the on-vehicle unit.

(14) An external signal supply unit that supplies an external signal to an on-vehicle unit mounted in a vehicle through radio communication, characterized by comprising a signal reception portion that receives a signal transmitted from a set range that is determined in advance, and a state-in-range acquisition portion that acquires a state in the set range on the basis of a signal received by the signal reception portion. The external signal supply unit according to the present clause can adopt the technical features mentioned in any one of clauses (1) to (13).

(15) The external signal supply unit according to clause (14), including an operation control portion that controls an operation state thereof in accordance with a state acquired by the state-in-range acquisition portion as to the set range. In the external signal supply unit, a signal from a signal emission unit as at least one unit that is located in a set range to emit a signal is received. A state in the set range is known on the basis of the received signal. For example, this state means a state of at least one signal emission unit located in the set range, a state of a unit that operates in response to a signal emitted from the signal emission unit, or a state that is obtained on the basis of the received signal irrespective of a state of the at least one signal emission unit. This is because a signal indicating an environment or the like in a set range stored in the signal emission unit is emitted in some cases. For example, if a signal emitted from an on-vehicle unit or an external signal supply unit in the set range has been received, it is apparent that the on-vehicle unit or the external signal supply unit exists in the set range. Further, an operation state of the on-vehicle unit or the external signal supply unit in the set range can be found out on the basis of the received signal. More specifically, if the received signal is an external signal, an additional external signal supply unit that exists in the set range and that is different from the external signal supply unit is transmitting an external signal. For example, if the external signal supply unit emits an external signal, this external signal causes radio interference with an external signal emitted from the additional external signal supply unit. In the case where additional signals are emitted in response to an external signal, it is apparent that radio interference may occur between the additional signals. If the received signal is identifier information corresponding to the identifier information stored in the storage portion, it is apparent that the on-vehicle unit supplied an external signal previously. If the identifier information does not correspond thereto, it is apparent that the on-vehicle unit has supplied an external signal for the first time. If there are a communication regulation unit, a central command unit, and the like as components different from the on-vehicle unit or the external signal unit in the set range, a state in the set range can be found out by receiving signals emitted therefrom. The communication regulation unit, the central command unit and the like may emit signals indicating states stored therein as to the set range. For example, the number of external signal supply units in the set range, the number of on-vehicle units in the set range, and the like are stored in the central command unit or the like. Signals indicating those numbers may be supplied. In the case where the external signal supply unit and the on-vehicle unit transmit signals only during predetermined operations instead of constantly transmitting signals, the existence of these units is unknown unless those operations are performed. On the other hand, a signal of the central command unit or the like makes the existence of those units known even if no signal is emitted therefrom. In any case, it is reasonable that the operation state of the external signal supply unit be controlled in accordance with a state in the set range.

(16) The external signal supply unit according to clause (14) or (15), wherein the information reception unit receives information transmitted from at least either at least one on-vehicle unit in the set range or at least one external signal supply unit in the set range, and wherein the state-in-range acquisition portion acquires information indicating a state in the set range on the basis of the information from at least either the at least one on-vehicle unit or the at least one external signal supply unit.

(17) The external signal supply unit according to any one of clauses (14) to (16), wherein the operation control portion includes a transmission suppression portion that suppresses transmission of an external signal if the state-in-range acquisition portion detects that there is an additional external signal supply unit other than the external signal supply unit in the set range. In the case where there are a plurality of external signal supply units in the set range, radio interference may occur even if an external signal has not actually been supplied from the additional external signal supply unit. In this case, it is desirable that the external signal supply unit be restrained in advance from transmitting an external signal. For example, the range permitting transmission is narrowed, for example, by reducing the intensity of an external signal.

(18) The external signal supply unit according to any one of clauses (1) to (17), wherein the external signal supply unit includes a central information processing unit and a terminal information supply unit that establishes radio communication with the central information processing unit, wherein at least one of identifier information indicating the terminal information supply unit and information indicating a state of the vehicle is supplied from the terminal information supply unit to the central information processing unit, wherein a vehicle state acquisition system thereby acquires the state of the vehicle in the central information, and wherein a transmission command signal transmission portion that supplies a signal commanding transmission of identifier information to the terminal information supply unit if at least one of an inspection of communication and an operation relating to the registration of identifier information on the terminal information supply unit in the central information processing unit is carried out is included. If the inspection of communication or the operation relating to registration is carried out in the central information processing unit, the external signal supply unit supplies a transmission command signal to the terminal information supply unit. For example, the operation relating to registration includes registration itself, an inspection of registration, and the like. In the inspection of communication, it is checked whether or not the central information processing unit has normally received the information transmitted from the terminal information supply unit. If the terminal information supply unit receives a transmission command signal, identifier information is transmitted correspondingly. In the central information processing unit, the identifier information is registered, or the inspection of registration is conducted on the basis of the identifier information. It is checked whether or not the supplied identifier information corresponds to the registered identifier information. It may also be checked at the same time whether or not signals can be received normally. The terminal information supply unit can be installed at such a position that makes the connection with the central information processing unit through a signal line difficult. At this position, the terminal information supply unit includes at least one vehicle state detection unit that detects a state of the vehicle. For example, a wheel, an unsprung member or the like may be equipped with the terminal information supply unit. The vehicle state detection unit may be designed to detect a state of the wheel as a state of the vehicle or to detect a state of the unsprung member. The state of the wheel means a state of air pressure in a tire (e.g., the value of an air pressure, a change amount in air pressure, a gradient of the change, whether the air pressure is normal or abnormal, or the like), a state of air temperature in the tire (the value of a temperature, an ascending gradient of the temperature, whether or not the temperature is high, or the like), a state of a force applied to the tire (e.g., the direction and magnitude of the force, whether the force is equal to or larger than a set value, or the like), or the like. The terminal information supply unit corresponds to the on-vehicle unit. In the external signal supply unit according to the present clause, identifier information is more reliably supplied from the terminal information supply unit in the vehicle state acquisition system. Therefore, identifier information can be registered more reliably, and the operation of altering the registered identifier information can be facilitated.

(19) A vehicle state acquisition system comprising a plurality of terminal information supply units, a central information processing unit that acquires a state of a vehicle on the basis of information transmitted from the terminal information supply units, and an external signal supply unit that supplies a transmission command signal commanding transmission of identifier information to each of the terminal information supply units, characterized in that the external signal supply unit includes an operation control portion that controls an operation state in accordance with a state of transmission of identifier information from at least one of the terminal information supply units in a set range that is determined in advance. If each of the terminal information supply units receives a transmission command signal, identifier information is transmitted therefrom. Therefore, the state of reception of the transmission command signal by the terminal information supply unit can be considered to correspond to the state of transmission of identifier information. The external signal supply unit according to any one of clauses (1) to (18) can be adopted in the vehicle state acquisition system of the present clause.

(20) A vehicle state acquisition system comprising a vehicle-body-side unit provided in a vehicle body of a vehicle, a wheel-side unit that is provided in each of a plurality of wheels of the vehicle and that transmits at least one of wheel state information indicating a state of each of the wheels and identifier information indicating itself, and an external signal supply unit that supplies a transmission command signal as a signal commanding transmission of the identifier information to the wheel-side unit if at least one of an operation relating to registration of identifier information and an inspection of communication is carried out in the vehicle-body-side unit, wherein the vehicle-body-side unit acquires a state of each of the wheels by receiving wheel information transmitted from the wheel-side unit, characterized in that the external signal supply unit includes an operation control portion that controls an operation state thereof in accordance with at least one of a state of transmission of identifier information from the at least one wheel-side unit in the set range determined in advance and a state of reception of identifier information by the vehicle-body-side unit. The external signal supply unit according to any one of clauses (1) to (19) can be adopted in the vehicle state acquisition system of the present clause. The wheel-side unit and the vehicle-body-side unit correspond to the on-vehicle unit. The wheel-side unit includes a wheel state detection unit that detects a state of a wheel.

(21) An external signal supply method of transmitting an external signal in accordance with a state in a set range that is determined in advance in an external signal supply unit that supplies an external signal through radio communication to an on-vehicle unit that is mounted in a vehicle.

(22) An external signal supply method of transmitting an external signal after acquisition of a state in a set range that is determined in advance in an external signal supply unit that supplies an external signal through radio communication to an on-vehicle unit that is mounted in a vehicle.

(23) The external signal supply method according to clause (21) or (22), wherein transmission of an external signal is suspended if the existence of an additional external signal supply unit other than the external signal supply unit is detected in the set range.

(24) The external signal supply method according to any one of clauses (21) to (23), wherein an external signal is supplied again to an on-vehicle unit if the external signal was thereby received previously and wherein an external signal is supplied to an additional on-vehicle unit if the external signal was not received by the on-vehicle unit.

DETAILED DESCRIPTION OF THE PREFERRED EMBODIMENTS

Figure 1:
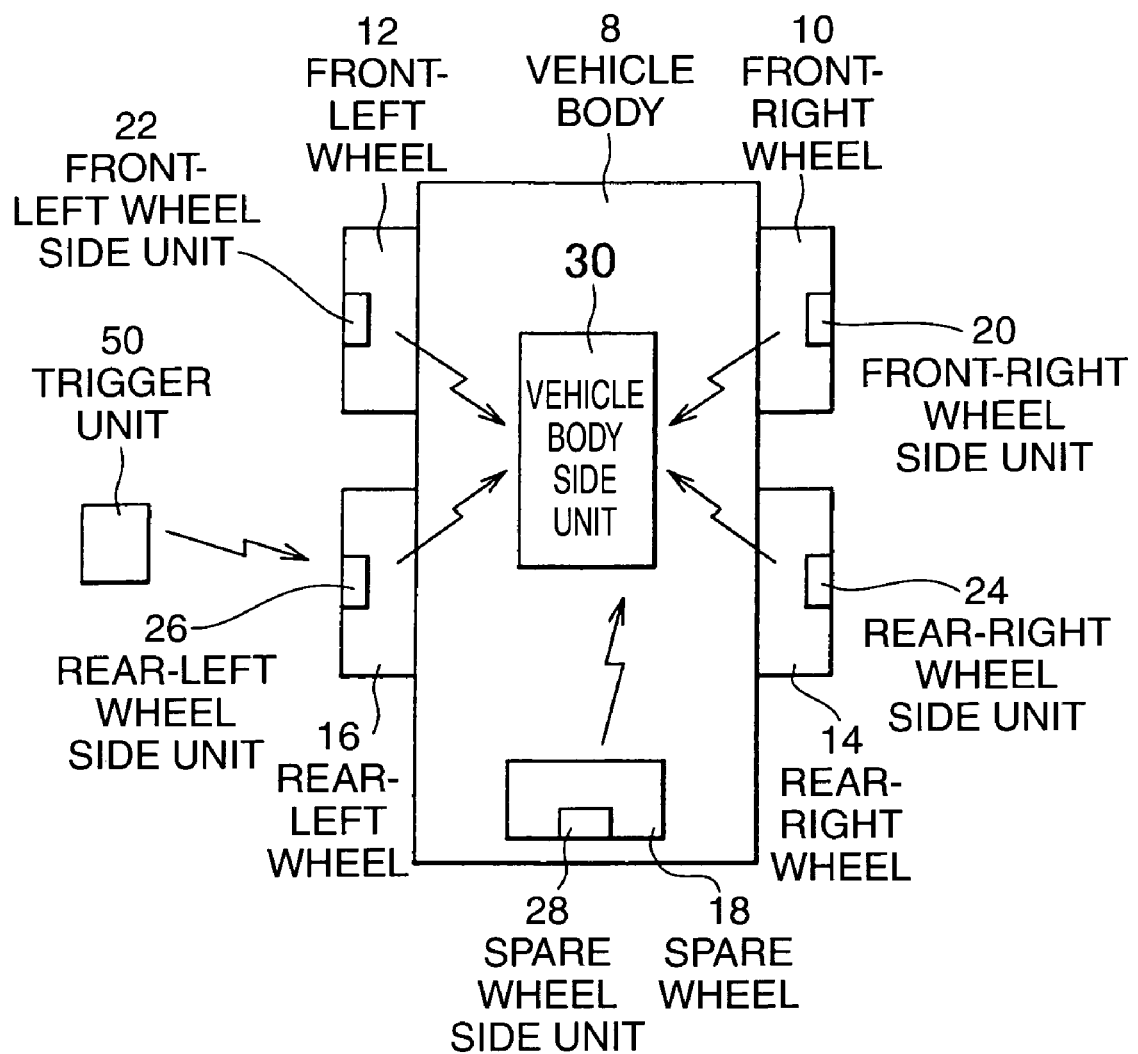
FIG. 1 is a conceptual view of an entire vehicle state acquisition system in accordance with one embodiment of the invention.

A wheel state acquisition system as a vehicle state acquisition system in accordance with one embodiment of the invention will be described with reference to the drawings. This wheel state acquisition system includes an external signal supply unit. As shown in FIG. 1, a vehicle body 8 is fitted with a front-right wheel 10, a front-left wheel 12, a rear-right wheel 14, and a rear-left wheel 16. A spare wheel 18, which is usually out of use, is stored in a luggage room in a rear area of the vehicle body 8, mounted below a floor panel, or attached to a back face or the like of the vehicle. Each of the wheels 10, 12, 14, 16 and 18 is construed to include a tire. The wheels 10, 12, 14, 16 and 18 are provided with wheel-side units 20, 22, 24, 26 and 28 respectively. The vehicle body 8 is provided with a vehicle-body-side unit 30. In the present embodiment, the wheel-side units 20, 22, 24, 26 and 28 and the vehicle-body-side unit 30 correspond to the on-vehicle unit. While the wheel-side units 20, 22, 24, 26 and 28 correspond to the terminal information supply unit, the vehicle-body-side unit 30 corresponds to the central information processing unit.

Figure 2:
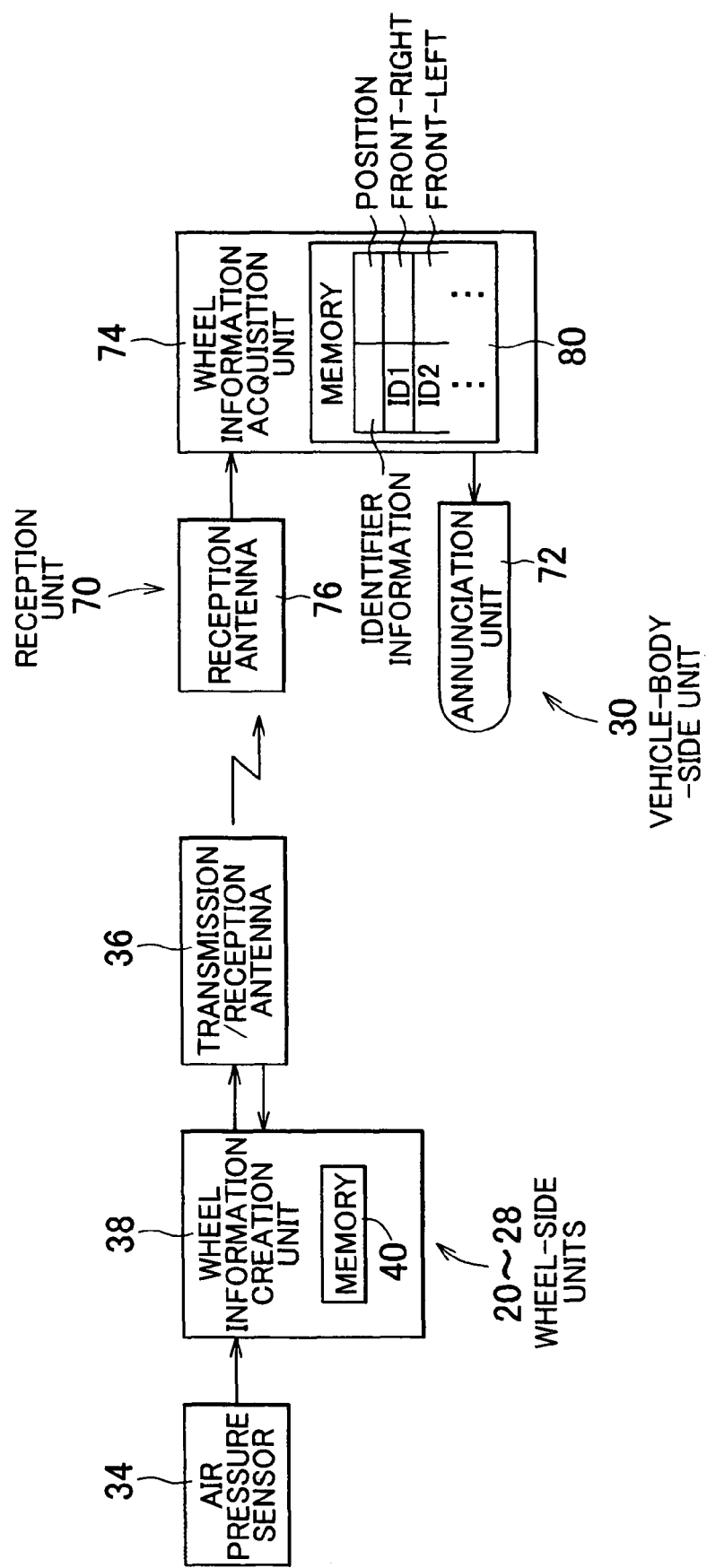
FIG. 2 is a conceptual view of a wheel-side unit and a vehicle-body-side unit of the vehicle state acquisition system.

As shown in FIG. 2, each of the wheel-side units 20, 22, 24, 26 and 28 includes an air pressure sensor 34 that detects an air pressure of the tire of the wheel 10, a transmission/reception antenna 36, and a wheel information creation unit 38 that creates sequential pieces of wheel information. The wheel information creation unit 38 includes a computer. The transmission/reception antenna 36 is connected to input and output portions of the wheel information creation unit 38. The air pressure sensor 34 is connected to another input portion of the wheel information creation unit 38. Identifier information is stored in a memory 40 of the wheel information creation unit 38.

In the wheel-side units 20, 22, 24 and 28, the air pressure sensor 34 detects an air pressure of the tire of the wheel 10, and sequential pieces of information are created in the wheel information creation unit 38 on the basis of the detected air pressure and the identifier information stored in the memory 40. The pieces of information include at least one of identifier information and air pressure information indicating an air pressure, and a predetermined communication signal such as a synchronizing signal, a check signal or the like. A trigger signal is supplied from the trigger unit 50, for example, if identifier information is registered in the vehicle-body-side unit 30 or if an inspection of registration or the system is carried out. If the trigger signal is received, wheel information including the identifier information stored in the memory 40 is created and transmitted. The wheel information created in this case may either include or exclude air pressure information.

The vehicle-body-side unit 30 includes a reception unit 70 that receives wheel information transmitted from the wheel-side units 20, 22, 24, 26 and 28, an annunciation unit 72 that advises a driver of the states of the tires, and a wheel information acquisition unit 74. The reception unit 70 includes a reception antenna 76. The wheel information acquisition unit 74 is mainly composed of a computer, and processes wheel information supplied from the reception unit 70. Identifier information supplied from the wheel-side units 20, 22, 24, 26 and 28 is stored in a memory 80 that is included in the wheel information acquisition unit 74. It is optional that the identifier information be stored in association with a longitudinal and/or lateral position of each of the wheels. The annunciation unit 72 includes a display, and is disposed, for example, in an instrument panel or the like inside a cabin. The display annunciates information relating to air pressure information supplied from the wheel-side units 20, 22, 24, 26 and 28.

The annunciation unit 72 may either annunciate an air pressure value or a result of a determination that is made by the information processing unit 74 as to whether an air pressure is normal or abnormal.

Figure 3:
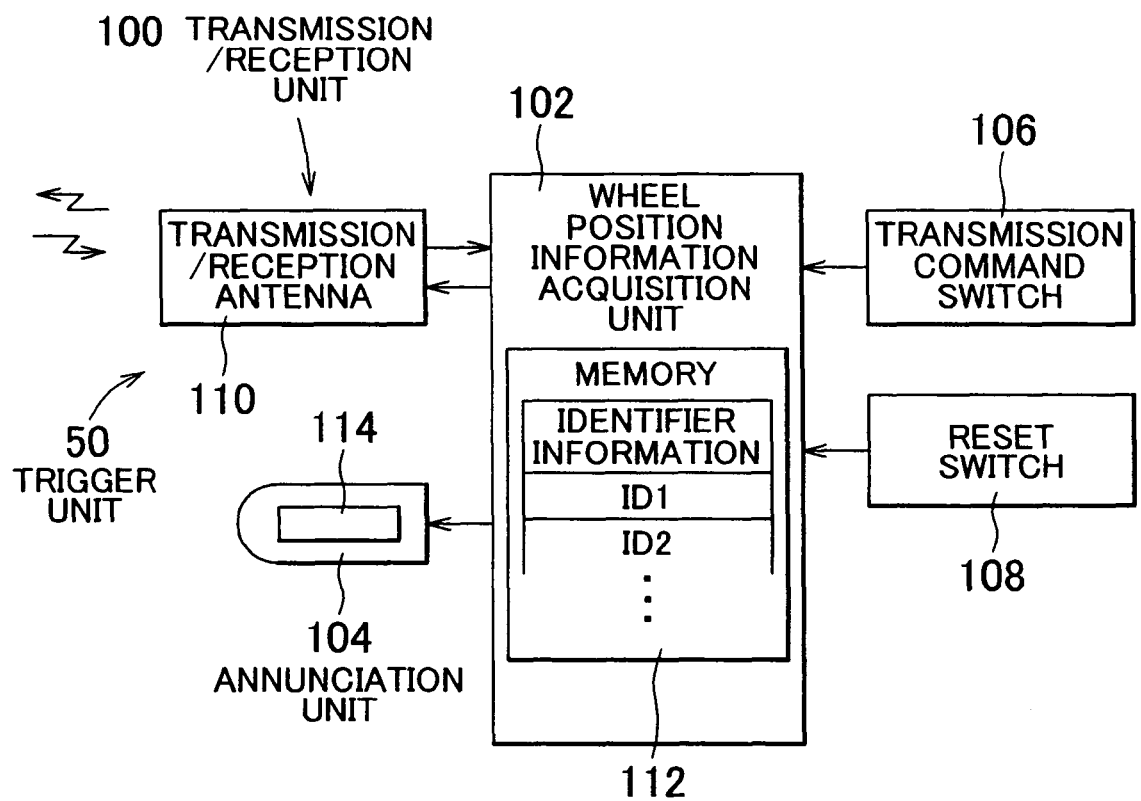
FIG. 3 is a conceptual view of a trigger unit of the vehicle state acquisition system.
Figure 6:
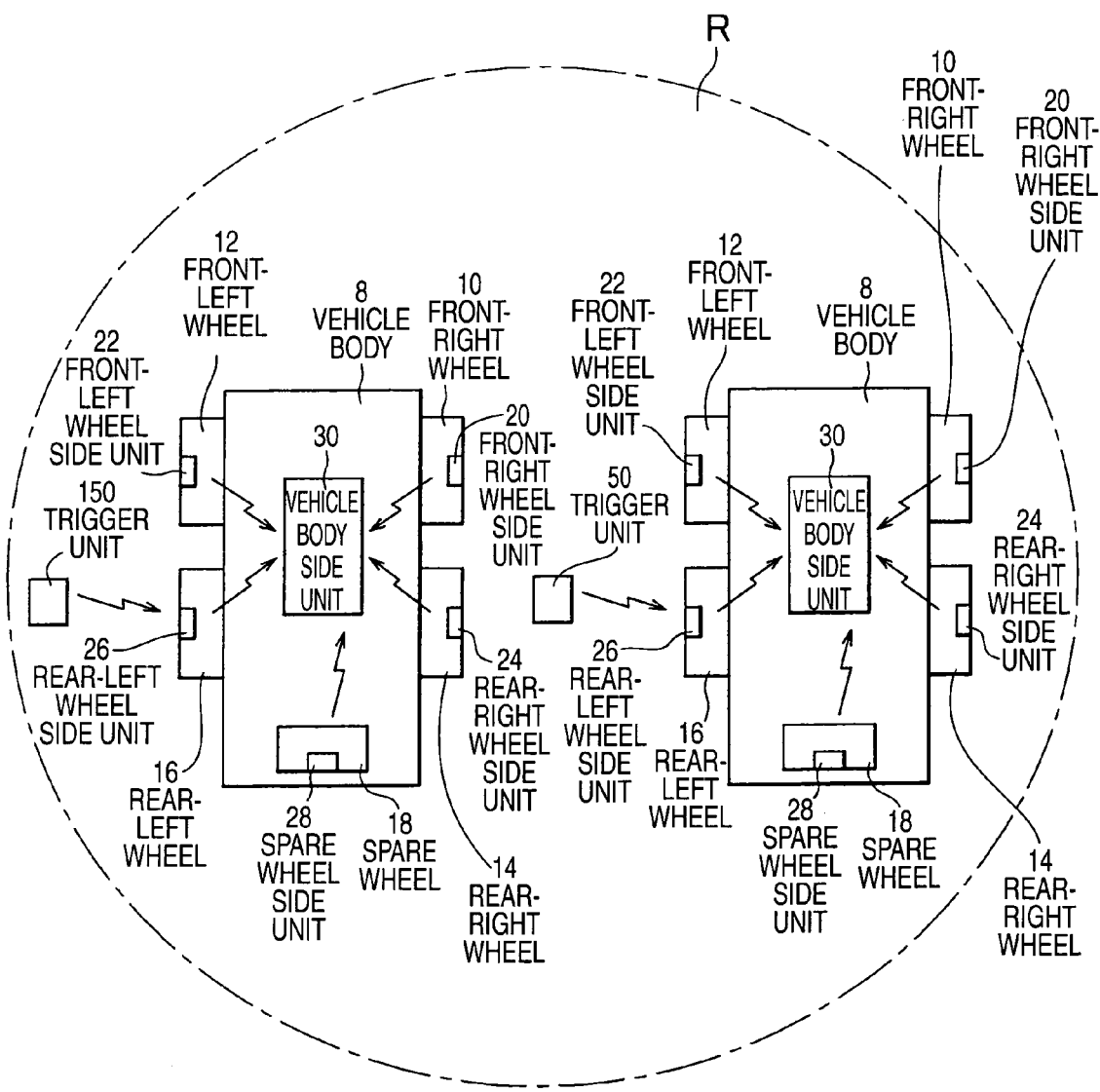
FIG. 6 shows a set range, that is, a range allowing communication by the trigger unit.

The trigger unit 50 corresponds to the external signal supply unit, and is used outside the wheel-side units 20, 22, 24, 26 and 28. In the present embodiment, the trigger unit 50 is used outside the vehicle and is a component separated therefrom. As shown in FIG. 3, the trigger unit 50 includes a transmission/reception unit 100, an information processing unit 102, an annunciation unit 104, a transmission command switch 106, a reset switch 108, and the like. In the present embodiment, the trigger unit 50 can transmit and receive signals. A range allowing communication by the trigger unit 50 is denoted by R in FIG. 6. A trigger signal is an RF (Radio Frequency) wave. The range R allowing communication by the trigger unit 50 corresponds to the set range. It is not indispensable that the trigger signal be an RF wave. The transmission/reception unit 100 includes a transmission/reception antenna 110. The transmission/reception antenna 110 transmits a trigger signal as a transmission command signal, receives a trigger signal transmitted from another trigger unit, and receives identifier information transmitted from the wheel-side units 20, 22, 24, 26 and 28. The transmission/reception unit 100 has a portion for transmitting a trigger signal. This portion or the like constitutes a transmission command signal transmission portion. The transmission/reception unit 100 has a portion for receiving identifier information. This portion or the like constitutes an identifier information reception portion.

The information processing unit 102, which is mainly composed of a computer, processes information received by the transmission/reception antenna 110 and issues a command to transmit a trigger signal. Identifier information transmitted from the wheel-side units 20, 22, 24, 26 and 28 is stored in a memory 112. The transmission command switch 106 is operated to issue a command to transmit a trigger signal. A trigger signal is transmitted from the transmission/reception antenna 110 in accordance with an operation of the transmission command switch 106. The reset switch 108 is also to be operated by an operator. By operating the reset switch 108, information stored in the memory 112 is cleared, or the counter value of a later-described counter is reset as an initial value. The annunciation unit 104, which includes a display 114, indicates the number of the wheel-side units 20, 22, 24, 26 and 28 that have transmitted identifier information in response to the supply of a trigger signal, and indicates whether the transmission of a trigger signal is to be permitted or forbidden (i.e., whether or not radio interference may be caused).

It is not indispensable that the reset switch 108 or the like be provided. A resetting operation may be performed automatically if a series of operations are terminated as to one vehicle. In this case, it is desirable that the inputting of the number of wheel-side units installed in one vehicle be made possible in advance. In the present embodiment, the vehicle-body-side unit 30 is provided with only one reception antenna, namely, the reception antenna 76. However, the vehicle body may be provided with a plurality of reception antennae at positions corresponding to the front-right, front-left, rear-right and rear-left wheels 10, 12, 14 and 16 and the spare wheel 18 in the rear area. In addition, the reception antenna 76 installed in the vehicle-body-side unit 30 may also be designed as a transmission/reception antenna that allows both transmission and reception. In the present embodiment, the wheel-side units 20, 22, 24, 26 and 28 include the air pressure sensor 34. However, the wheel-side units 20, 22, 24, 26 and 28 may also include a temperature sensor for detecting a temperature inside a tire, an application force sensor for detecting a force applied to a tire, a rotational speed sensor for detecting a rotational speed of a wheel, and the like in addition to or in place of the air pressure sensor 34.

Figure 7:
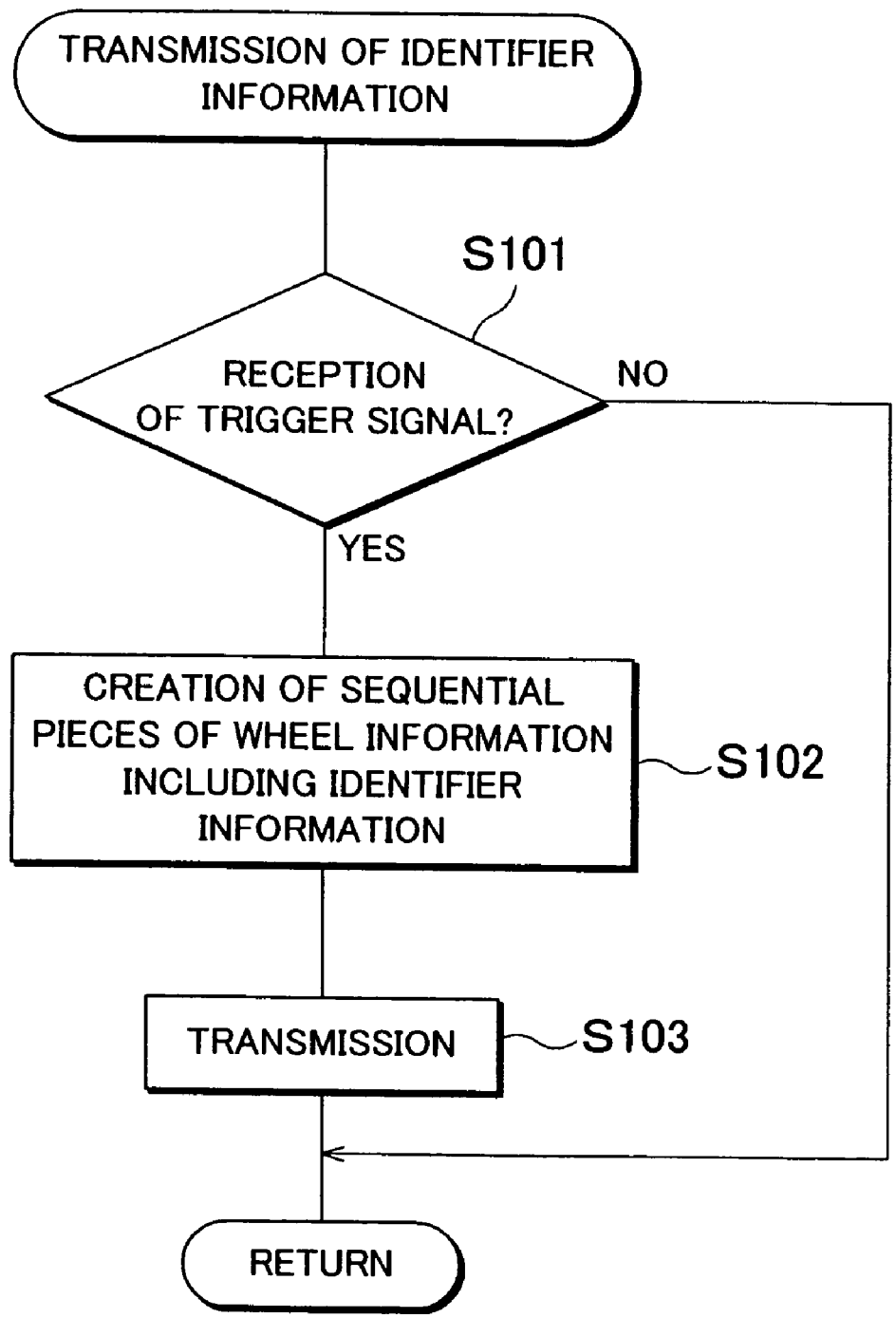
FIG. 7 is a flowchart showing an identifier information transmission program that is stored in a storage portion of a wheel information creation portion of the wheel-side unit.

The operation of the wheel state acquisition system constructed as described above will be described. In the wheel-side units 20, 22, 24, 26 and 28, if a trigger signal supplied from the trigger unit 50 is received, the wheel information creation portion 38 creates sequential pieces of wheel information including identifier information. These pieces of wheel information are transmitted from the transmission/reception antenna 36. In all the other cases, sequential pieces of wheel information including air pressure information and identifier information are created and transmitted at intervals of a set period that is determined in advance. In the wheel-side units, an identifier information transmission program shown in a flowchart of FIG. 7 is executed at intervals of a set period that is set in advance. In a step 101 (hereinafter referred to as S101 and likewise as to the other steps), it is determined whether or not a trigger signal has been received by the transmission/reception antenna 36. If the trigger signal has been received, sequential pieces of wheel information including identifier information are created in S102. The sequential pieces of wheel information are then transmitted from the transmission/reception antenna 36 in S103.

If a registration mode is set in the vehicle-body-side unit 30, identifier information included in the wheel information transmitted from the wheel-side units 20, 22, 24, 26 and 28 is registered in the memory 80. If an inspection mode is set in the vehicle-body-side unit 30, it is determined whether or not the identifier information included in the received wheel information corresponds to the identifier information registered in the memory 80 in advance. If there is a piece of identifier information that does not correspond thereto, a piece of information indicating the existence thereof is output to the annunciation unit 72. In the inspection mode, an inspection as to the possibility of normal reception of a signal supplied from the wheel-side units 20, 22, 24, 26 and 28 is also carried out. If a wheel state acquisition mode (referred to also as a normal mode) is set in the vehicle-body-side unit 30, an air pressure value is extracted from wheel information transmitted from the wheel-side units 20, 22, 24, 26 and 28, and is output to the annunciation unit 72. The operator conveys the trigger unit 50 to positions contiguous to the wheels 10, 12, 14 and 16. The trigger unit 50 is operated at each of these positions. In the trigger unit 50, if the operator operates the transmission command switch 106, a trigger signal is transmitted from the transmission/reception antenna 110 in response thereto. The trigger signal is prevented from being transmitted if another trigger signal transmitted from another trigger unit has been received. If a trigger signal is transmitted to the wheel-side units 20, 22, 24, 26 and 28, the annunciation unit 104 is advised of the number of the wheel-side units that have transmitted identifier information.

Figure 4A:
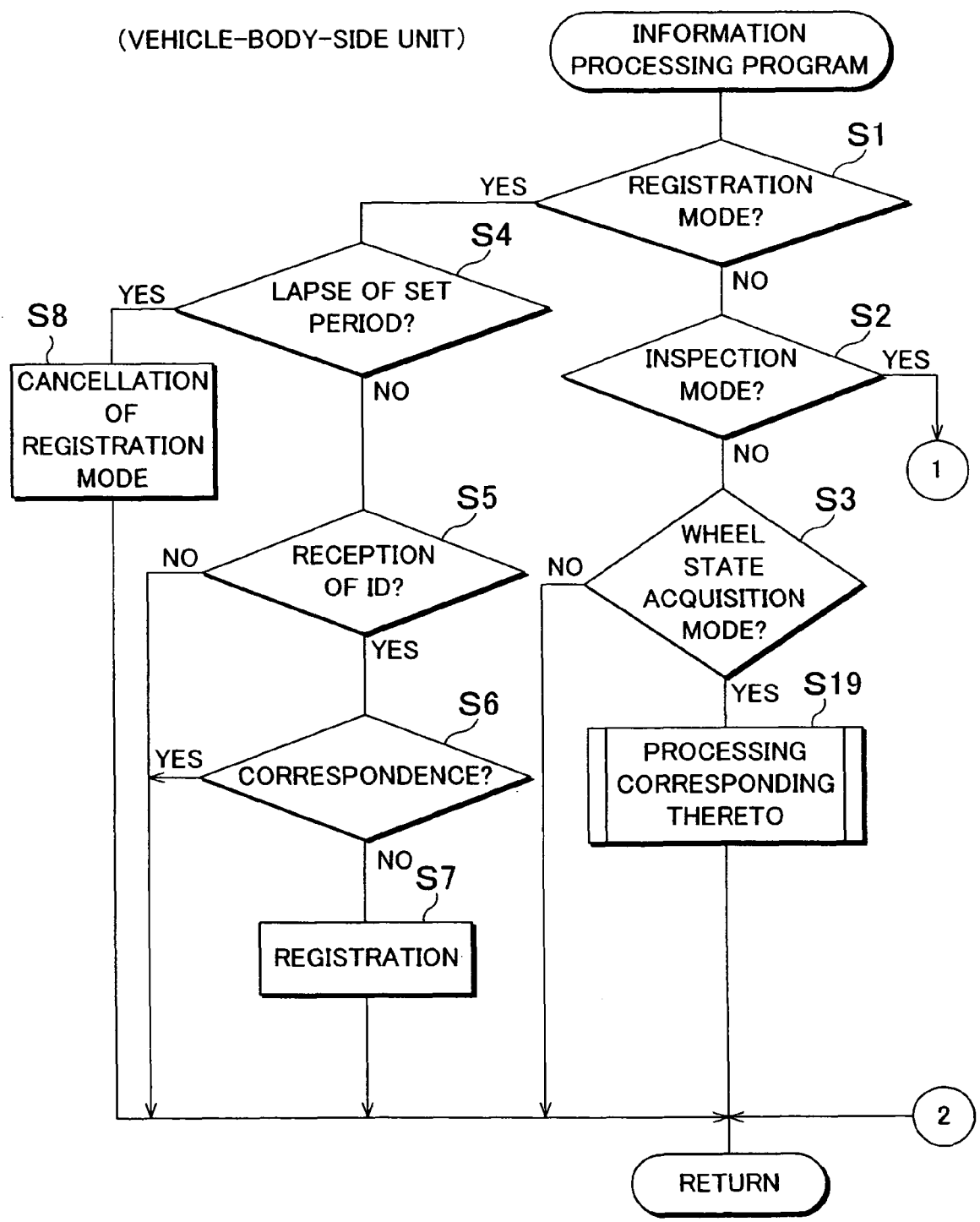
FIG. 4 is a flowchart showing an information processing program that is stored in a storage portion of an information processing unit of the vehicle-body-side unit.
Figure 4B:
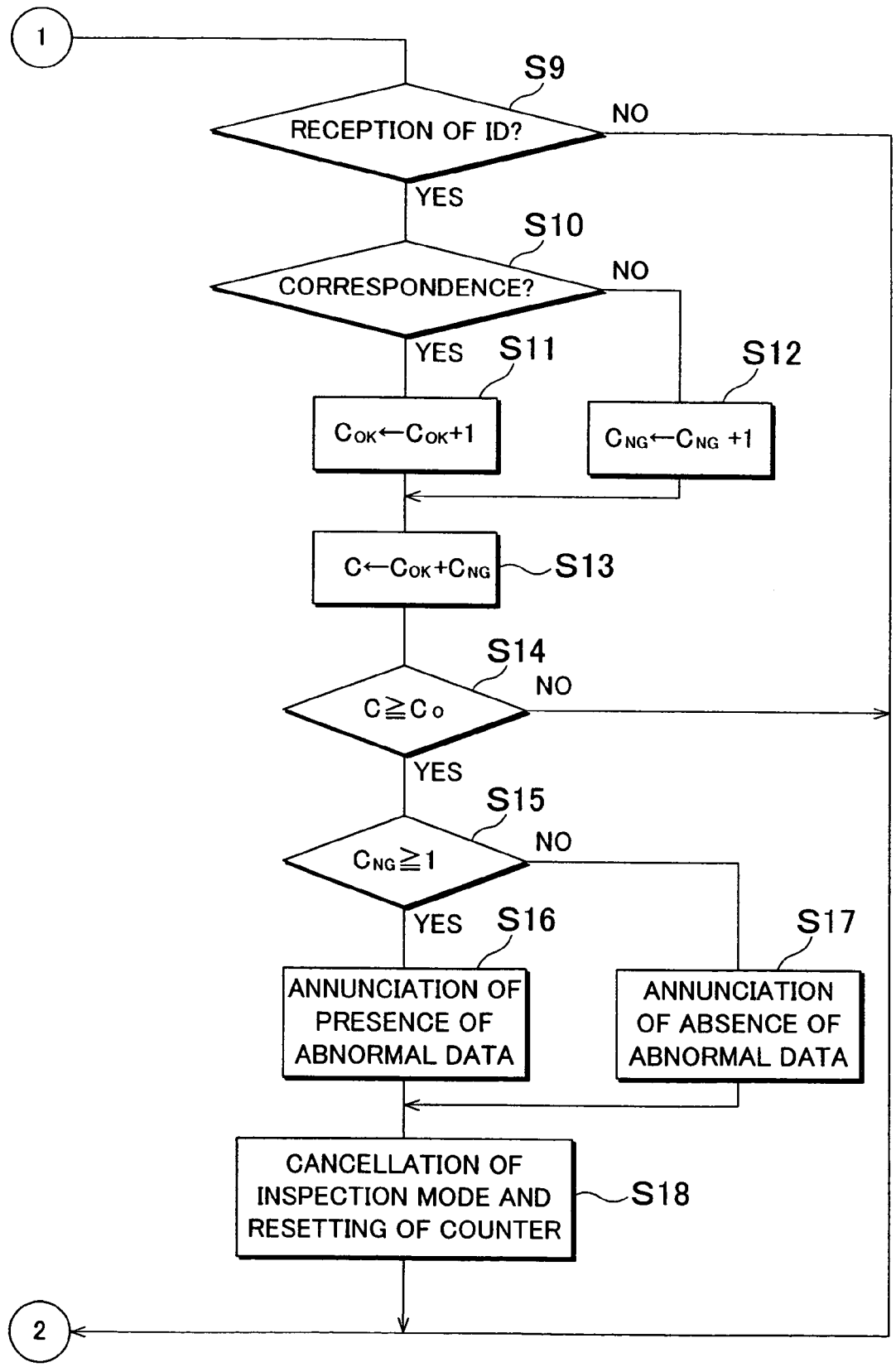

In the vehicle-body-side unit 30, an information processing program shown in a flowchart of FIG. 4 is executed at intervals of a set period that is determined in advance. It is determined in S1 whether or not the registration mode has been set. It is determined in S2 whether or not the inspection mode has been set. It is determined in S3 whether or not the wheel state acquisition mode has been set. The operator sets one of those modes as a separate procedure. If the registration mode has been set, the result of the determination in S1 is YES, and it is determined in S4 whether or not a set period has elapsed since the setting of the registration mode. The identifier information that is received until the set period elapses since the setting of the registration mode is regarded as the identifier information transmitted from the wheel-side units 20, 22, 24, 26 and 28 corresponding to the vehicle body 8, and is stored in the memory 80.

Until the set period elapses, it is determined in S5 whether or not identifier information has been received. If identifier information has been received, it is determined in S6 whether or not the received identifier information corresponds to the identifier information that has already been stored in the memory 80. If the received identifier information has not been stored in the memory 80 yet, namely, if the received identifier information does not correspond to the stored identifier information, it is not regarded as corresponding thereto. If the received identifier information does not correspond thereto, it is registered in the memory 80 in S7. If the received identifier information corresponds to the identifier information that is already registered in the memory 80, it is not additionally registered therein. In the present embodiment, identifier information is to be transmitted to the wheel-side units 20, 22, 24, 26 and 28 in this order. If identifier information is stored in this order, it is stored in association with the positions of the wheels. After the lapse of the set period, the registration mode is cancelled in S8.

If the inspection mode has been set, the result of the determination in S2 is YES. It is then determined in S9 and S10 whether or not the received identifier information corresponds to the identifier information stored in the memory 80. If the received identifier information corresponds thereto, the count value of a counter $C_{OK}$ is increased by 1 in S11. If the received identifier information does not correspond thereto, the count value of a counter $C_{NG}$ is increased by 1 in S12. A sum C of the count values of the counters $C_{OK}$ and $C_{NG}$ is calculated in S13. It is determined in S14 whether or not the sum C has become equal to or larger than a set value $C_0$ (5 in the present embodiment) corresponding to the number of the wheels. If the sum C is smaller than the set value $C_0$, the processings in S9 to S14 are repeatedly performed. If the sum C has become equal to or larger than $C_0$, it is determined in S15 whether or not the counter value of the counter $C_{NG}$ has become equal to or larger than 1. If the counter value of the counter $C_{NG}$ has become equal to or larger than 1, a piece of information indicating an abnormality in registration is output to the annunciation unit 72 in S16. If the counter value of the counter $C_{NG}$ is smaller than 1, a piece of information indicating the completion of normal registration is output. It is advised via the annunciation unit 72 whether the registration has been carried out normally. Then in S18, the inspection mode is then cancelled and the counters $C_{OK}$ and $C_{NG}$ are cleared.

If the wheel information acquisition mode has been set, a processing corresponding thereto is performed in S19. As described above, it is determined whether or not wheel information has been received. If the wheel information has been received, it is determined whether or not the identifier information included in the wheel information corresponds to the identifier information registered in the memory 80. If the identifier information included in the wheel information does not correspond thereto, it is regarded as having been transmitted from a wheel-side unit of another vehicle, and the acquisition of an air pressure does not occur. If the identifier information included in the wheel information corresponds thereto, air pressure information is acquired. An air pressure value is annunciated via the annunciation unit 72.

Figure 5:
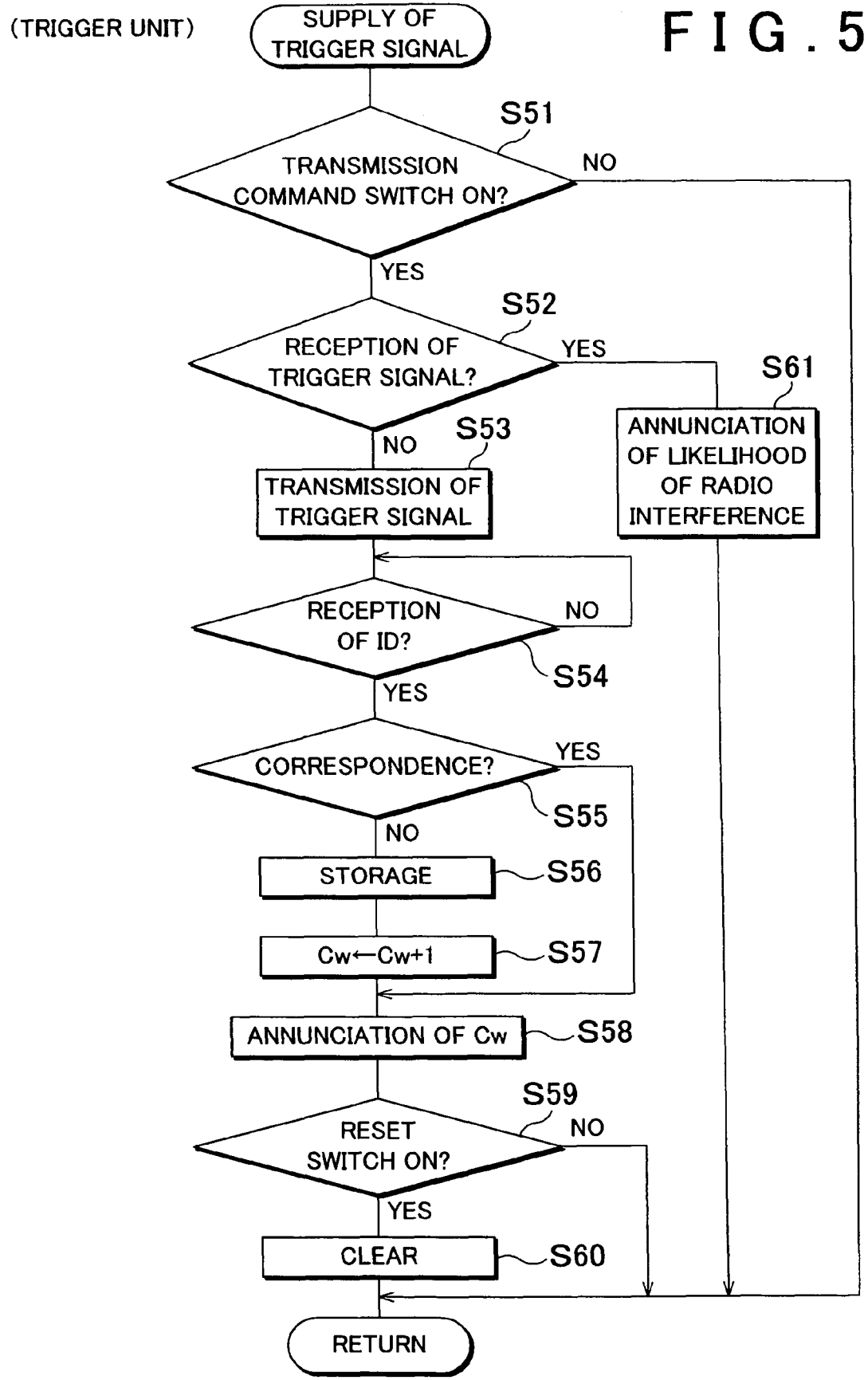
FIG. 5 is a flowchart showing a trigger signal supply program that is stored in a storage portion of an information processing unit of the trigger unit.

In the trigger unit 50, a trigger signal supply program shown in a flowchart of FIG. 5 is executed at intervals of a set period that is determined in advance. It is determined in S51 whether or not the transmission command switch 106 has been turned on. If the transmission command switch 106 remains off, the processings starting from S52 are not performed. The transmission command switch 106 is operated, for example, in registering identifier information, inspecting the system, or inspecting the state of registration. If the transmission command switch 106 has been turned on, it is determined in S52 whether or not the transmission/reception antenna 110 has received a trigger signal. In the case where there is an additional trigger unit 150 in the set range R shown in FIG. 6 and where this trigger unit 150 has transmitted a trigger signal, this trigger signal is received. If no trigger signal has been received, a trigger signal is transmitted in S53, and it is determined in S54 whether or not identifier information has been received. By supplying a trigger signal to the wheel-side units 20, 22, 24, 26 and 28, identifier information is transmitted. The identifier information transmitted from the wheel-side units 20, 22, 24, 26 and 28 is received.

It is because there is no additional trigger unit in the range R or because an additional trigger unit in the range R has not transmitted a trigger signal that the transmission/reception antenna 110 of the trigger unit 50 receives no trigger signal. That is, even in the case where a trigger signal has been transmitted from the trigger unit 50 and where identifier information has been transmitted from the wheel-side units, the vehicle-body-side unit 30 is capable of receiving the identifier information normally. In other words, the wheel-side units are allowed to transmit the identifier information. In this case, therefore, a trigger signal is transmitted from the trigger unit 50. On the other hand, a trigger signal is received if the additional trigger unit 150 in the range R has transmitted the trigger signal. If a trigger signal is transmitted from this trigger unit 50 so that identifier information is transmitted from the wheel-side units, the vehicle-body-side unit 30 is highly unlikely to receive the identifier information normally as a result of radio interference. In this case, therefore, the trigger unit 50 is prevented from transmitting a trigger signal.

If identifier information has been received through the supply of a trigger signal, it is determined in S55 whether or not the identifier information corresponds to the identifier information stored in the memory 112. If no identifier information is stored in the memory 112, namely, if the received identifier information does not correspond to the identifier information stored in the memory 112, the received identifier information is stored in S56, and a count value Cw of a counter for measuring the number of the wheel-side units 20, 22, 24, 26 and 28 is increased by 1 in S57. If the received identifier information corresponds thereto, the count value Cw remains untouched instead of being increased. The count value Cw is then output to the annunciation unit 104 in S58.

Thus, by looking at the display 114, the operator can confirm whether or not a trigger signal has successfully been supplied to a desired one of the wheel-side units. For example, in the case where the spare wheel 18 is mounted below the floor panel or the like of the vehicle body, even if the operator believes himself or herself to have supplied a trigger signal to the spare wheel 18, the trigger signal may be supplied to the rear wheels 14 and 16, and identifier information may be transmitted again therefrom. In this case, a trigger signal can be transmitted by operating the transmission command switch 106 again, for example, by bringing the trigger unit 50 closer to the spare wheel 18. Thus, for each of the wheel-side units, it is confirmed that identifier information has been transmitted therefrom by supplying a trigger signal. Hence, the operator can perform operations while confirming whether or not a trigger signal has been received by each of the wheel-side units. Even in the case where the same pieces of identifier information are supplied to the vehicle-body-side unit 30, since they are not redundantly registered therein, no abnormality in registration is thereby caused. Those pieces of identifier information which have not been transmitted are to be transmitted later. Therefore, the vehicle-body-side unit 30 is highly likely to receive all the pieces of identifier information, so that the likelihood of a registration error decreases. As a result, the operation of correcting registered data and the like are facilitated, and the manufacturing cost can be increased.

It is determined in S59 whether or not the reset switch 108 has been operated. If it is detected that the reset switch 108 has been turned on, the identifier information stored in the memory 112 is cleared in S60, and the count value of the counter Cw is set as 0. In the case where the operator has supplied a trigger signal as to every one of the wheels included in the vehicle and where identifier information has been transmitted correspondingly, the count value of the counter Cw assumes 5 (i.e., the number of wheels to be provided in the vehicle). It is thereby revealed that identifier information has been transmitted from all the wheel-side units 20, 22, 24, 26 and 28.

If a trigger signal has been received, the result of the determination in S52 is YES, and a piece of information indicating a likelihood of radio interference is output to the annunciation unit 104 in S61. By looking at the annunciation unit 104, the operator finds that the trigger signal has not been transmitted. By operating the transmission command switch 106 again after the disappearance of an indication provided by the annunciation unit 104, the operator can transmit a trigger signal correspondingly.

In the aforementioned embodiment, if a trigger signal has been supplied from the additional trigger unit 150 in the set range R, no trigger signal is transmitted from the trigger unit 50. However, it is also appropriate to determine, through a communication between the trigger units 50 and 150 in the range R, which one of them is to be prohibited from transmitting a trigger signal. Further, it is also appropriate that the trigger unit 50 be prohibited from transmitting a trigger signal after having received it, and that the trigger unit 50 automatically transmit a trigger signal after having come to receive no more trigger signals.

Furthermore, the trigger unit 50 may be designed to perform the processing in S52 to detect a likelihood of radio interference if a main switch or the like other than the transmission command switch 106 is turned on. For example, if there is a likelihood of radio interference, a prohibition on the operation of the transmission command switch 106 is annunciated. Further, in the aforementioned embodiment, the trigger unit 50 is designed to perform a radio interference avoidance function (i.e., a function of avoiding a state where the identifier information transmitted from a plurality of wheel-side units cannot be normally received by the vehicle-body-side unit 30 as a result of radio interference) and a count-up function (i.e., a function of counting up the number of the wheel-side units that have transmitted identifier information through the transmission of a trigger signal). However, the trigger unit 50 may be designed to perform only one of those functions. By being designed to perform at least one of the functions, the trigger unit 50 can reliably supply identifier information correspondingly. In the present embodiment, furthermore, if a trigger signal is supplied from a trigger unit to a wheel-side unit in each of adjacent vehicles, the wheel-side unit may not receive an external signal due to radio interference. According to the external signal supply unit of the present embodiment, however, the wheel-side units may also be guaranteed to receive an external signal.

Further, the present embodiment is designed to carry out both the registration of identifier information and the inspection of the registration of identifier information. However, the present embodiment may be designed to carry out only one of them and to abandon the other. Moreover, the present embodiment may also be designed to additionally or separately inspect a system for confirming the occurrence of a normal communication or the like. It is not indispensable that the registration of identifier information and the inspection of the registration be carried out through the changeover from one mode to the other. It is also appropriate, however, that two separate units be provided to carry out the registration of identifier information and the inspection of the registration respectively.

Furthermore, in the aforementioned embodiment, the operator conveys the trigger unit 50. It is also appropriate, however, that the trigger unit 50 be automatically moved while transmitting a trigger signal at the position corresponding to each of the wheels 10, 12, 14, 16 and 18. In this case as well, the invention can be applied likewise. For example, in the aforementioned embodiment, the annunciation unit 72 annunciates a piece of information acquired by the trigger unit 50 as an indication of a state inside the range R. In addition thereto or in place thereof, however, it is also appropriate that a central control unit be advised of this piece of information. The annunciation of the information inside the range R is not absolutely required. That is, the trigger unit 50 may be designed to operate in accordance with the information within the range R. For example, if a trigger signal transmitted from another trigger unit has been received, the transmission of the trigger signal may be forbidden for a set period. If the identifier information that has been received by the trigger unit in response to a trigger signal transmitted thereby corresponds to the identifier information stored in the memory 112, the trigger unit may transmit a trigger signal again with its posture or its position relative to the wheel-side units having been changed.

What is claimed is:

1. An external signal supply unit comprising:
    a supplying portion that supplies an external signal to an on-vehicle unit mounted in a vehicle through radio communication;
    an operation control portion that controls an operation state thereof in accordance with at least one on-vehicle unit in a set range that is determined in advance;
    a transmission command signal transmission portion that transmits a transmission command signal commanding the transmission of identifier information indicating the on-vehicle unit as the external signal;
    an identifier information reception portion that receives identifier information that has been transmitted from the on-vehicle unit in accordance with the transmission command signal;
    an identifier information storage portion that stores the identifier information that has been received by the identifier information reception portion; and
    an annunciation portion that annunciates a reception state of the external signal in the on-vehicle unit, and an annunciation control portion that regards the on-vehicle unit as having received the external signal if the identifier information received by the identifier information reception portion does not correspond to predetermined identifier information stored in the identifier information storage portion, that does not regard the on-vehicle unit as having received the external signal if the identifier information received by the identifier information reception portion corresponds the predetermined identifier information, and that thereby controls the annunciation portion, wherein
    the identifier information storage portion increments a first counter based on identifier information for a plurality of on-vehicle units corresponding to the identifier information stored in the identifier information storage portion, and increments a second counter based on identifier information not corresponding to the identifier information stored in the identifier information storage portion, until a total of tile first counter and the second counter exceeds a predetermined number of on-vehicle units; and wherein
    thee annunciation portion annunciates the presence or absence of abnormal data based on whether any non-corresponding identifiers have been counted by the second counter of the identifier information storage portion.

2. The external signal supply unit according to claim 1, wherein the operation control portion includes a transmission suppression portion that suppresses transmission of a second external signal transmitted from a second external signal supply unit when there is at least one on-vehicle unit receiving the external signal in the set range by disabling an automatic transmission of the second external signal by the second external signal supply unit.

3. The external signal supply unit according to claim 1, wherein the operation control portion includes a transmission state control portion that suppresses the transmission of the external signal in the case where at least one on-vehicle unit in the set range has received the external signal transmitted from a second external signal supply unit other than the external signal supply unit and where the external signal supply unit is selected through a bidirectional communication between both the external signal supply units.

4. The external signal supply unit according to claim 1, further comprising an external signal transmission portion that transmits the external signal, and
wherein the operation control portion includes a transmission suppression portion that suppresses the operation of the external signal transmission portion if at least one on-vehicle unit in the set range is receiving a second external signal supplied from a second external signal supply unit other than the external signal supply unit.

5. The external signal supply unit according to claim 1, further comprising an annunciation portion that annunciates a state of at least one on-vehicle unit in the set range, and
wherein the annunciation control portion controls the annunciation portion to annunciate a statement that at least one on-vehicle unit in the set range is receiving a second external signal supplied from a second external signal supply unit other than the external signal supply unit if the statement turns out to be true.

6. The external signal supply unit according to claim 1, wherein the annunciation control portion ensures annunciation of a statement that the on-vehicle unit to which the external signal has been supplied received the external signal previously if the statement turns out to be true.

7. The external signal supply unit according to claim 1, wherein the annunciation control portion ensures annunciation of a statement that an on-vehicle unit to which the external signal is to be supplied received the external signal previously if tile statement turns out to be true.

8. The external signal supply unit according to claim 1, wherein the annunciation portion annunciates the number of on-vehicle units that have transmitted the identifier information, and the annunciation control portion that increases the number of the on-vehicle units to be annunciated by the annunciation portion by one if the identifier information received by the identifier information reception portion does not correspond to the identifier information stored in the identifier information storage portion and that does not increase the number of the on-vehicle units if the identifier information received by the identifier information reception portion corresponds thereto.

9. The external signal supply unit according to claim 1, further comprising:
a reception state determination portion that regards the on-vehicle unit as having received an external signal if the identifier information received by the identifier information reception portion does not correspond to the identifier information stored in the identifier information storage portion and that does not regard the on-vehicle unit as having received the external signal if the identifier information received by the identifier information reception portion corresponds thereto.

10. The external signal supply LU1it according to claim 1, further comprising:
a transmission control portion that ensures transmission of the transmission command signal to a subsequent one of the on-vehicle units if the identifier information received by the identifier information reception portion does not correspond to the identifier information stored in the identifier information storage portion and that ensures retransmission of the transmission command signal to the same on-vehicle unit if the identifier information received by the identifier information reception portion corresponds thereto.

11. The external signal supply unit according to claim 10, wherein the external signal supply unit includes a signal reception portion that receives a response signal that has been transmitted from the on-vehicle unit in accordance with the external signal, and wherein the operation control portion includes a retransmission control portion that ensures re-supply of tile external signal if it is determined on the basis of the response signal received by the signal reception portion that that one of the on-vehicle units which has supplied the response signal received the external signal previously.

12. The external signal supply unit according to claim 1, wherein the external signal supply unit includes a signal reception portion that receives a response signal that has been transmitted from the on-vehicle unit in accordance with the external signal, and wherein the operation control portion includes a determination control portion that determines whether or not that one of the on-vehicle units which has supplied the response signal received the external signal previously if the signal reception portion has received the response signal.

13. The external signal supply unit according to claim 1, wherein the external signal supply unit includes a central information processing unit and a terminal information supply unit that establishes radio communication with the central information processing unit,
wherein at least one of identifier information indicating the terminal information supply unit and information indicating a state of the vehicle is supplied from the terminal information supply unit to the central information processing unit,
wherein a vehicle state acquisition system thereby acquires the state of the vehicle in the central information, and
wherein the transmission command signal transmission portion that supplies a signal commanding transmission of identifier information to the terminal information supply unit if at least one of an inspection of communication and an operation relating to the registration of identifier information on the terminal information supply unit in the central information processing unit is carried out.

14. An external signal supply unit that supplies an external signal to an on-vehicle unit mounted in a vehicle through radio communication, comprising:
a signal reception portion that receives a signal transmitted from a set range that is determined in advance;
a state-in-range acquisition portion that acquires a state in the set range on the basis of the signal received by the signal reception portion;
a transmission command signal transmission portion that transmits a transmission command signal commanding the transmission of identifier information indicating the on-vehicle unit as the external signal;
an identifier information reception portion that receives the identifier information that has been transmitted from the on-vehicle unit in accordance with the transmission command signal;
an identifier information storage portion that stores the identifier information that has been received by the identifier information reception portion; and
an annunciation portion that annunciates a reception state of the external signal in the on-vehicle unit, and an annunciation control portion that regards the on-vehicle unit as having received the external signal if the identifier information received by the identifier information reception portion does not correspond to predetermined identifier information stored in the identifier information storage portion, that does not regard the on-vehicle unit as having received the external signal if the identifier information received by the identifier in formation reception portion corresponds to the predetermined identifier information, and that thereby controls the annunciation portion, wherein the identifier information storage portion increments a first counter based on identifier information for a plurality of on-vehicle units corresponding to the identifier information stored in the identifier information storage portion, and increments a second counter based on identifier information not corresponding to tile identifier information stored in the identifier information storage portion, until a total of the first counter and the second counter exceeds a predetermined number of on-vehicle units; and wherein the annunciation portion annunciates the presence or absence of abnormal data based on whether any non-corresponding identifiers have been counted by the second counter of the identifier information storage portion.

15. The external signal supply unit according to claim 14, further comprising an operation control portion that controls an operation state thereof in accordance with the state acquired by the state-in-range acquisition portion as to the set range.

16. The external signal supply unit according to claim 14, wherein the information reception unit receives information transmitted from at least either at least one on-vehicle unit in the set range or at least one external signal supply unit in the set range, and wherein the state-in-range acquisition portion acquires information indicating the state in the set range on the basis of the information from at least either the at least one on-vehicle unit or the at least one external signal supply unit.

17. The external signal supply unit according to claim 14, wherein the operation central portion includes a transmission suppression portion that suppresses transmission of the external signal if the state-in-range acquisition portion detects that there is a second external signal supply unit other than the external signal supply unit in the set range.

18. The external signal supply unit according to claim 14, wherein the external signal supply unit includes a central information processing unit and a terminal information supply unit that establishes radio communication with the central information processing unit, wherein at least one of identifier information indicating the terminal information supply unit and information indicating the state of the vehicle is supplied from the terminal information supply unit to the central information processing unit, wherein a vehicle state acquisition system thereby acquires thr state of the vehicle in the central information, and wherein the transmission command signal transmission portion that supplies a signal commanding transmission of identifier information to the terminal information supply unit if at least one of an inspection of communication and an operation relating to the registration of identifier information on the terminal information supply unit in the central information processing unit is carried out.

19. A vehicle state acquisition system comprising:
a plurality of terminal information supply units;
a central information processing unit that acquires a state of a vehicle on the basis of information transmitted from the terminal information supply units;
an external signal supply unit that supplies a transmission command signal commanding transmission of identifier information indicating an on-vehicle unit as the external signal to each of the terminal information supply unit;

an identifier information reception portion that receives the identifier information that has been transmitted from the on-vehicle unit in accordance with the transmission command signal;

an identifier information storage portion that stores the identifier information that has been received by the identifier information reception portion; and an annunciation portion that annunciates a reception state of an external signal in the on-vehicle unit, and an annunciation control portion that regards the on-vehicle unit as having received the external signal if the identifier information received by the identifier information reception portion does not correspond to predetermined identifier information stored in the identifier information storage portion, that does not regard the on-vehicle unit as having received the external signal if the identifier information received by the identifier information reception portion corresponds tile predetermined identifier information, and that thereby controls the annunciation portion, wherein the external signal supply unit includes an operation control portion that controls an operation state in accordance with a state of transmission of identifier information from at least one of the terminal information supply units in a set range that is determined in advance, and wherein the identifier information storage portion increments a first counter based on identifier information for a plurality of on-vehicle units corresponding to the identifier information stored in the identifiers information storage portion, and increments a second counter based on the identifier information not corresponding to the identifier information stored in the identifier information storage portion, until a total of the first counter and the second counter exceeds a predetermined number of on-vehicle units; and wherein the annunciation portion annunciates the presence or absence of abnormal data based on whether any non-corresponding identifiers have been counted by the second counter of the identifier information storage portion.

20. An external signal supply method that supplies an external signal through radio communication to an on-vehicle unit that is mounted in a vehicle, comprising the steps of:

transmitting the external signal after acquisition of a state in a set range that is determined in advance;

transmitting a transmission command signal commanding the transmission of identifier information indicating the on-vehicle unit as the external signal;

receiving identifier information that has been transmitted from the on-vehicle unit in accordance with the transmission command signal;

storing the received identifier information; and annunciating a reception state of the external signal in the on-vehicle unit, the reception state being one of (1) the on-vehicle unit is regarded as having received the external signal if the identifier information received by the identifier information reception portion does not correspond to predetermined identifier information, or (2) the on-vehicle unit is not regarded as having received the external signal if the received identifier information corresponds to the predetermined identifier information, wherein storing the received identifier information includes incrementing a first counter based on identifier information for a plurality of on-vehicle units corresponding to the stored identifier information and incrementing a second counter based on identifier information not corresponding to the stored identifier information until a total of the first counter and the second counter exceeds a predetermined number of on-vehicle units; and wherein annunciating the reception state includes annunciating the presence or absence of abnormal data based on whether any non-corresponding identifiers have been counted by the second counter.

21. The external signal supply method according to claim 20, wherein transmission of the external signal is suspended if the existence of a second external signal supply unit other than a first external signal supply unit is detected in the set range.

22. The external signal supply method according to claim 20, wherein the external signal is supplied again to the on-vehicle unit if the external signal was thereby received previously and wherein the external signal is supplied to a second on-vehicle unit if the external signal was not received by the on-vehicle unit.

* * * * *